United States Patent

Binner et al.

Patent Number: 5,563,106
Date of Patent: Oct. 8, 1996

[54] POROUS ARTICLES

[75] Inventors: Jonathan G. P. Binner, West Bridgford; Robert T. Smith, Sheffield; Jutta Reichert, Melton Mowbrey; Rodney M. Sambrook, Sheffield, all of Great Britain

[73] Assignee: Dytech Corporation Limited, Sheffield, Great Britain

[21] Appl. No.: 575,236

[22] Filed: Dec. 20, 1995

Related U.S. Application Data

[63] Continuation of Ser. No. 185,627, Jan. 24, 1994, abandoned.

[30] Foreign Application Priority Data

Aug. 12, 1991 [GB] United Kingdom .................... 9117421
Aug. 12, 1992 [GB] United Kingdom .................... 9117422

[51] Int. Cl.$^6$ .......................... C04B 38/00; C04B 38/10
[52] U.S. Cl. .................... 501/84; 501/80; 501/85; 252/306; 252/307; 252/310
[58] Field of Search .................. 501/80, 84, 85; 252/306, 307, 310

[56] References Cited

U.S. PATENT DOCUMENTS

| | | | |
|---|---|---|---|
| 3,041,190 | 6/1962 | Griffith et al. | 501/84 |
| 3,148,996 | 9/1964 | Vukasovich et al. | 501/84 |
| 3,737,332 | 6/1973 | Sennett et al. | 501/84 |
| 4,318,996 | 3/1982 | Madger | 501/84 |
| 4,341,561 | 7/1982 | Britt et al. | 501/84 |
| 4,375,516 | 3/1983 | Barrell | 501/84 |
| 4,505,866 | 3/1985 | Oguri et al. | 264/42 |
| 4,547,469 | 10/1985 | Jackson et al. | 501/84 |
| 4,707,312 | 11/1987 | Bajaj | 501/84 |

FOREIGN PATENT DOCUMENTS

| | | |
|---|---|---|
| 130031 | 1/1985 | European Pat. Off. . |
| 1573863 | 7/1969 | France . |
| 347057 | 2/1922 | Germany . |
| 3801132 | 7/1989 | Germany . |

Primary Examiner—Karl Group
Assistant Examiner—Michnel Marcheschi
Attorney, Agent, or Firm—Caesar, Rivise, Bernstein, Cohen and Pokotilow, Ltd.

[57] ABSTRACT

A method of making a porous refractory article and a dispersion of particles in a liquid carrier, the method involving forming a dispersion of particles in a liquid carrier, introducing gas into the dispersion, removing the liquid carrier to provide a solid article having pores derived from the bubbles and wherein the dispersion has a critical viscosity below the level at which the introduction of gas cannot take place and above the level which entrapped gas bubbles will tend to escape and with the dispersion having the same critical viscosity.

42 Claims, No Drawings

POROUS ARTICLES

This application is a continuation of application Ser. No. 08/185,627, filed Jan. 24, 1994 now abandoned.

The invention relates to porous refractory articles and in particular to the manufacture thereof.

It is known to introduce gas into a mixture of particulate solids and a liquid carrier to form a foam which is then dried and fired to form a porous solid, typically ceramic.

FR-A-1003500 published in 1952 discloses a method in which a colloidal suspension of a clay in water is subjected to the formation of bubbles and setting simultaneously, to form, it is said, intercommunicating pores of uniform size. In the example, the deflocculating agent is soda which reacts with aluminium powder to generate in situ bubble-forming hydrogen gas and to cause flocculation.

U.S. Pat. No. 3,041,190 published in 1962 discloses the use of a colloidal alumina having a boehmite structure and an organic foaming agent to form a wet foam. It is said that the use of colloidal alumina renders the foam resistant to collapse for at least 30 minutes.

GB-A-1272010 published in 1972 discloses a method in which a particulate ceramic material is mixed with an aqueous colloidal dispersion binder and gas generating agent to provide after activation by heating a structure containing fine pores uniformly distributed therein.

U.S. Pat. No. 4,505,586 published in 1985 discloses a method of making a foamed product by incorporating a thickener, surfactant and binder while introducing bubbles into a slurry of a boehmite and water. The surfactant will be anionic or nonionic when the slurry is alkaline, and cationic or nonionic when the slurry is acidic. The binder may be a cement.

DE-A-3729371 published in 1988 discloses in very general terms a predominantly open-celled porous structure formed by mixing a particulate ceramic material, an aluminosilicate hydrogel, a surfactant and a gel strengthening agent. The surfactant is preferably a silicone glycol, and the gel strengthening agent is preferably silica fume.

GB-A-2213814 published in 1989 discloses making a foamed mixture by mixing a slip of silicon dioxide and a solution of a foaming agent, agitating and adding an alkaline magnesium or calcium compound.

EP-A-0330963 published in 1989 discloses a process in which an aqueous ceramic composition comprising particulate ceramic material and a film-forming polymer is frothed. Surfactants such as sulphonates and natural soaps may be used.

JP-A-0234583 published in 1990 discloses dispersing a foaming agent into a sol followed by gelling to produce a porous ceramic having a porosity gradient.

EP-A-0360244 published in 1990 discloses a method of making a structure having macropores in which a ceramic powder is mixed with a solution of a high molecular weight material such as celluloses, polyacrylamides etc.

It is one object of the invention to provide improved methods of making articles and the improved articles. In particular green bodies, i.e. those ready for firing, may be made more quickly, with better mechanical strength and handling and machining characteristics. The method offers the possibility of making articles which are larger in volume and/or of smaller pore size than by comparable routes. In addition, the methods may be applied to a wide range of starting materials and result in the formation of articles which consist essentially of the starting materials only.

According to the invention in one aspect there is provided a method of making a porous refractory article, the method comprising the steps of:

a) forming a dispersion comprising particles in a liquid carrier;

b) introducing gas into the dispersion; and c) removing the liquid carrier to provide a solid article having pores derived from the bubbles, characterised in that the dispersion has a critical viscosity selected to be below the level at which the introduction of gas cannot take place and above the level at which entrapped gas bubbles will tend to escape.

The viscosity of the dispersion will be low by which we mean that the viscosity must be less than that level at which the introduction of gas cannot take place and above the level at which entrapped gas bubbles will tend to escape. By the term "critical viscosity" is meant the corresponding viscosity at the critical stress value, see K. S. Chou, L. J. Lee, "Effects of Dispersants on the Rheological Properties and Slip Casting of concentrated Alumina Slurries", *J. Amer. Ceram. Soc.* 72 (9) 1989, 1622–1627.

The critical viscosity of the dispersion will be in the range of from about 5 mPa.s, to about 1000 mPa.s preferably 25 mPa.s to about 1000 mPa.s, more preferably 25 mPa.s to about 250 mPa.s. The preferred range is dependent on the method of gas entrapment. For entrapment by mechanical means e.g. stirring, the preferred range is 25 mPa.s to about 200 mPa.s. For gas entrapment by mechanical means using a filter of defined pore size, the preferred range is about 50 mPa.s to about 250 mPa.s.

The dispersion comprises particles selected according to the intended end product in a liquid carrier and preferably is formulated so that the dispersion is essentially colloidal in nature. The average particle size will tend to be less than about 5 micrometers and preferably 95% of the particles will be less than about 2 micrometers. If the particles are larger than this size then the particles tend to settle or sediment. However, the particles can be much larger, say 100 micrometers or more, in which case agents will be present to control undesired settling; polymerisation of monomers is a suitable means for preventing settling.

The nature of the particles present will depend on the intended end use of the porous article to be formed. In the case of a ceramic it may be one or more of alumina, mullite, silicon carbide, silicon nitride, boron nitride, boron carbide, cordierite, silicas; zirconia, spinels, hydroxyapatite, magnesia and other metal oxides, e.g. tin oxide or titanium oxide or metal salts, e.g. nickel nitrate, nickel carbonate and the like. Multi-component compositions may be used. Metals or alloys, e.g. ferrochrome, ferrosilicon, may be used. Dusts and other wastes from industrial processes may be used. The particles may be in the form of gelatinous precipitates. If necessary, powders may be ground or milled to achieve a suitable particle size distribution. This may be particularly useful if the particles are waste products from other processes. A high dispersion of the particles may also be prepared by a sol-gel technique.

The content of the solids in the dispersion will tend to be about 10% by weight as a minimum and about 90% by weight as a maximum; a preferred range is from about 40% to about 85% by weight.

Conveniently the liquid carrier is water but it may be organic, e.g. an alcohol, glycol or the like; or a mixture.

Where there is a risk that the formed dispersion will tend to undergo premature settling of solids it is preferred to add agents e.g. deflocculating agents so that the dispersion will be maintained. In the case of small particles, any premature settling or sedimentation will of course tend to disrupt the colloidal nature of the dispersion; the settling can take place by agglomeration of particles over time. The agent may be a deflocculating agent the nature of which will depend on the particles and the liquid carrier; for ceramic particles in water single or multiplecomponent surfactants (non-ionic, cationic or anionic), or carbohydrates may be used. Additives which adjust pH and polymers are also suitable agents. For large or small particles polymerisable monomers may also be used.

The bubbles of gas may be introduced in any convenient way. For convenience and economy the gas is air. Preferred methods of introduction include:

1. subjecting the dispersion to a high intensity and/or high speed agitation while exposed to the atmosphere. The agitation is preferably carried out using a mixer, e.g. a mechanical mixer rotated at high speed. The agitation is carried out for sufficient period to introduce bubbles of air into the dispersion until expansion has been achieved according to the desired physical and other properties of the end product. The expansion ratio, i.e. the volume of foam formed compared to the volume of the starting dispersion, can be between about 10.1 and about 10, preferably between about 1.2 and about 1.7. The foaming of the dispersion may also be judged visually, i.e. because the foamed composition takes on the appearance of a meringue or pumice when sufficient air has been introduced. Other gases which can be introduced include nitrogen and oxygen;
2. the gas may be introduced by bubbling the gas through a filter of a defined pore size into the dispersion while being stirred. In this case the final pore size of the foam may be dependant on the pore size of the filter;
3. in a variation, high pressure gas is forced through a fine filter, then intimately mixed with the dispersion in a suitable chamber and the aerated mixture is then ejected from a nozzle;
4. the aerosol method may also be used, in this case the dispersion is housed in a pressurised vessel and gas is injected under pressure into the dispersion to produce a foam when ejected via a nozzle;
5. in another technique, a reactive gas generating substance may be added to the dispersion, the substance being selected to react with acid or alkali present with the dispersion to produce the required gas in situ, either when included or when subjected to agitation or heating.

The foaming characteristics of the dispersion may be controlled by the inclusion of a surfactant. The foam may be stabilised by the inclusion of foam builders. The addition of one substance may fulfil both roles.

A bonding or stabilising agent may be added to prevent collapse of the formed foam. It has been discovered that a deflocculating agent can fulfil this role also but any cationic, anionic or non-ionic surfactant can be considered.

Other additives may be present, e.g. liquefiers, viscosity control agents, reinforcing fibres or particles, accelerators, retarders, colourants, and the like.

The foamed composition may be allowed or caused to acquire sufficient green strength to allow it to be moved from the parent container or mould. The composition may be subjected to drying to drive off the liquid. In the case of water the drying can be carried out at below about 100° C. in an oven or using high frequency drying equipment. The drying step may be varied. For example, the drying may be done under reduced pressure to cause the foam to expand before the green strength is developed. The degree of expansion and hence the pore size of the foam will depend on the pressure selected. Drying at elevated temperature tends to cause a slight expansion of the foam. It is preferred to control the humidity during the drying step, to prevent uneven shrinkage and drying cracks, whereas if the polymerisable material is present in the dispersion this step might not need to be taken.

The dispersion may include other ingredients which play a role at the drying stage. Examples include binders such as resins, e.g. polyvinylchloride, gums, celluloses, and polymerisable materials to increase green strength. A specific class of such additives is organic monomers such as soluble acrylates and acrylamides. The additives are preferably dissolved in deionised water or other carrier liquid or a mixture to produce a premix solution, an initiator is added to the dispersion before foaming and a catalyst after foaming. Elevated temperature can be a suitable substitute for the catalyst or both may be used together. The resultant formed body after drying is relatively robust, and this addition is especially preferred when the article to be formed is of a complex shape.

Subsequent processing will depend on the nature of the intended article and the materials used; examples of suitable steps include shaping, e.g. machining, firing, impregnation of-the pores with, e.g. catalysts and/or other agents. Porous articles made according to the invention can include: catalyst supports, flame supports; gas filters; airfresheners; ceramic armour; diesel particulate traps; insulation materials; artificial parts for the body; metal filters, reusable filters; liquid filters; Storage and transportation for flammable and/ or toxic materials, humidity sensors, chromatrography, filter candles for filtration of hot combustion gases, diaphragms, membranes, refractory separators, phase dividers and electrolytes for high temperature fuel cells.

The characteristics of the end product may be varied according to the conditions under which the method is performed. Where the contents of the solids in the dispersion is low, the viscosity will be reduced but the dispersion stability may be affected; lower viscosity dispersions tend to yield articles of lower density, i.e. higher pore content for a given solids content. By increasing the speed of stirring when introducing the gas bubbles the article formed will have a high pore content and a finer average pore size.

It is a feature of the invention that the final articles formed consist essentially of the starting refractory materials only, so avoiding the need for the presence of residual secondary materials, e.g. inorganic binders.

Our evaluations suggest that the pores size in the formed article can be controlled remarkably uniform. The pores may be closed and/or the porosity may be open. The true porosity may range from about 20% to about 95%.

In another aspect the invention provides a dispersion comprising particles in a liquid carrier characterised in that the dispersion has a critical viscosity selected to below that level at which the introduction of gas cannot take place and above the level at which entrapped gas bubbles will tend to escape.

The invention also includes a method of foaming a porous refractory article characterised by including a polymerisable monomer in the low viscosity dispersion of a particulate refractory material and water, foaming, drying and then sintering, whereby the article formed is relatively robust. The polymerisation preferably proceeds by crosslinking of reactive organic monomers. Examples include acrylates, such as ammonium acrylate or hydroxyethyl methacrylate; or the like. Preferably the monomers are dissolved in water or other liquid carrier to give a premix solution to which an initiator is added to cause free radical vinyl polymerisation to take place. Heat and/or a catalyst may be used to accelerate the process. In another variation, the dispersion includes a monosaccharide such as galactose, which can be condensed to form a dimer, trimer or polymer, to have the same effect.

In another aspect the invention provides an article comprising a fired porous body comprising bonded refractory particles, characterised in that the body comprises essentially the refractory particles only.

In yet another aspect the invention provides an article having green strength comprising a foamed body of bonded refractory particles, characterised in that the article includes a polymerised monomer which will be removed when the article is fired.

In order that the invention may be well understood it will now be described by way of illustration only with reference to the following Examples.

EXAMPLE I

Preparation of the Dispersion or Slurry

Different particulate materials as specified in Table I were each mixed with water and DECON 75 surfactant in the proportions specified and stirred for 5 minutes or until a homogeneous slip was obtained. (DECON 75 commercial formulations are believed to contain a polybasic dispersant and non-ionic surfactants). The slips were then subjected to a KERRY 150W 24000 Hz ultrasonics unit set at 28 micrometers movement for 2 minutes to form an essentially colloidal suspension.

EXAMPLE II

A slurry comprising 80 wt % alumina powder (Alcoa Grade A16 SG) with a mean particle size of less than 2 micrometers was prepared as in Example I. The slip was transferred to a Buchner funnel 120 mm diameter, with 10–16 micrometre pores and nitrogen bubbles through the funnel at a pressure of 0.4 bar for about 2 minutes. The nitrogen supply was then switched off and the foam slip transferred to a filter paper box and allowed to dry at room temperature for about 20 hours. The sample was then calcined by heating to 400° C., at a ramp rate of 1° C./minute and held at this temperature for 1 hour before heating to 1450° C. at a ramp rate of 5° C. and holding for 1 hour. The sample was then cooled to room temperature. The results are shown in Table I.

EXAMPLE III

A slurry comprising 61 wt % hydroxyapatite (Jesse Shirley Grade G1A) with a mean particle size of less than 3 micron was prepared as in the Example I. The slip was transferred to a Buchner funnel 120 mm diameter, with 10–16 micrometre pores and nitrogen bubbled through the funnel at a pressure of 0.4 bar for about 2 minutes. The nitrogen supply was then switched off and the foam slip transferred to a filter paper box and allowed to dry at room temperature for about 20 hours. The sample was then calcined by heating to 400° C., at a ramp rate of 1° C./minute and held at this temperature for 1 hour before heating to 1300° C. at a ramp rate of 5° C. and holding for 1 hour. The sample was then cooled to room temperature. The results are shown in Table I.

EXAMPLE IV

A slurry comprising 75 wt % partially stabilised yttria zirconia (Zirconia Sales Grade HSY-3) was prepared as in Example I. The slip was transferred to a Buchner funnel 120 mm diameter, with 10–16 micrometre pores and nitrogen bubbled through the funnel at a pressure of 0.4 bar for about 2 minutes. The nitrogen supply was then switched off and the foam slip transferred to a filter paper box and allowed to dry at room temperature for about 20 hours. The sample was then calcined by heating to 400° C., at a ramp rate of 1° C./minute and held at this temperature for 1 hour before heating to 1500° C. at a ramp rate of 5° C. and holding for 1 hour. The sample was then cooled to room temperature. The results are shown in Table I.

EXAMPLE V

A slurry comprising 75 wt % alumina powder (Alcoa Grade A16 SG) with a mean particle size of less than 2 micrometre was prepared as in Example I. The slip was then transferred to a 400 ml beaker and stirred using a paddle blade rotating at 1250 rev/min for 5 minutes to entrap air. The foamed slip was then transferred to a filter paper box and placed in an oven at 36° C. for 10 hours. The sample was then calcined by heating to 400° C., at a ramp rate of 1° C./minute and held at this temperature for 1 hour before heating to 1450° C. at a ramp rate of 5° C. and holding for 1 hour. The sample was then cooled to room temperature. The results are shown in Table I.

EXAMPLE VI

A slurry comprising 71.4 wt % partially stabilised yttria zirconia (Zirconia Sales Grade HSY-3) was prepared as in the Example I. The slip was then transferred to a 400 ml beaker and stirred using a paddle blade rotating at 1250 rev/min for 5 minutes to entrap air. The foamed slip was then transferred to a filter paper box and allowed to dry at room temperature for about 20 hours. The sample was then calcined by heating to 400° C., at a ramp rate of 1° C./minute and held at this temperature for 1 hour before heating to 1500° C. at a ramp rate of 5° C. and holding for 1 hour. The sample was then cooled to room temperature. The results are shown in Table I.

EXAMPLE VII

A slurry comprising 78 wt % alumina powder (Alcoa Grade A16 SG) with a mean particle size of less than 2 micrometre was prepared as in Example I. The slip was then transferred to a 400 ml beaker and stirred using a paddle blade rotating at 1250 rev/min for 5 minutes to entrap air. The foamed slip was then transferred to a filter paper box and allowed to dry at room temperature for about 20 hours. The sample was then calcined by heating to 400° C., at a ramp rate of 1° C./minute and held at this temperature for 1 hour before heating to 1450° C. at a ramp rate of 5° C. and holding for 1 hour. The sample was then cooled to room temperature. The results are shown in Table I.

EXAMPLE VIII

A slip was formed of 50 g of hydroxyapatite, 2.74 ml of DECON 75 and 50 ml of deionized water. The slip was subjected to ultrasonic agitation at an amplitude of 24 millimeter for 2 minutes. Agarose, 1 g, was added. The slip was heated to 90° C. and then stirred in air at 1200 rpm for 3 minutes. The foamed slip was poured into a filter paper box and then cooled in a refrigerator to 8° C., allowing the agarose to set. The set foam was dried to a green strength and then sintered at 1350° C. for 1 hour. The product had a mean pore diameter of 24 micrometre.

EXAMPLE IX

Alumina, ammonium acrylate monomer, misethylenebisacrylamide crosslinking agent, ammonium polycarboxylate dispersant, the ammonium salt of polymethacrylic acid, Teepol surfactant and water were mixed to form a low viscosity slip which was subjected to ultrasonic vibration in the manner of Example 1. Ammonium persulphate initiator was stirred in. The slip was transferred to a beaker and stirred using a Kenwood mixer (175 W power at speed setting 3 for about 5 minutes) when a foam of uniform consistency was obtained. Triethanolamine catalyst was stirred in for about 30 seconds. The foam started to polymerise and was left for 24 hours at room temperature, and then dried at 60° C. in an oven. The sample was then sintered by being heated at 400° C. for one hour, then at 1450° C. for two hours.

EXAMPLE X

A premix solution was made of acrylamide, methylenebisacrylamide and water. Alumina and DECON 75 were added and the whole stirred until a smooth slip was obtained. The slip was subjected to ultrasonic vibration for 2 minutes. The low viscosity slip was transferred to a beaker and ammonium persulphate was added. The slip was stirred using a mixer to generate a foam. Tetramethylethylenediamine was stirred in for a minute and left to homogenise the mix. It was transferred to a beaker and left to stand for 14 hours. The sample was then removed, and heated to 70° C. in an oven. The sample was then heated slowly to 1450° C. at which it was left for one hour. The sample has 81% porosity.

| Example No. | Ceramic material | Method of gas entrapment | Wt % of material | DECON in mg/g of material | Drying Temp. °C. | Sintering Temp. °C. | Critical visc./ mPas | Density % |
|---|---|---|---|---|---|---|---|---|
| II | Al$_2$O$_3$ | F | 80.0 | 30.0 | RT | 1450 | 101.4 | 7.0 |
| III | HA | F | 61.0 | 50.0 | RT | 1300 | 64.4 | 13.0 |
| IV | ZrO$_2$ | F | 75.0 | 50.0 | RT | 1500 | 182.0 | 19.0 |
| V | Al$_2$O$_3$ | S | 75.0 | 50.0 | 36.0 | 1450 | 23.0 | 16.0 |
| VI | ZrO$_2$ | S | 71.4 | 50.0 | RT | 1500 | 27.1 | 16.0 |
| VII | Al$_2$O$_3$ | S | 78.0 | 70.0 | RT | 1450 | 45.0 | 39.0 |
| VIII | HA | S | 48.0 | 60.0 | Setting - 8 Drying - RT | 1350 | 15.0 | 52.0 |
| IX | Al$_2$O$_3$ | S | 68.0 | * | 60 | 1450 | 180.0 | 7.0 |
| X | Al$_2$O$_3$ | S | 59.0 | 40.0 | 70 | 1450 | 103.0 | 19.0 |

F = Buchner funnel, S = Mecahnical Stirrer; HA = Hydroxyapatite; RT = Room Temperature
*text

We claim:

1. A method of making a porous refractory solid article, the method comprising the steps of:
   (a) forming a dispersion comprising particles of a refractory starting material in a liquid carrier; the formed dispersion having a critical viscosity of 25 mPas to about 1000 mPas;
   (b) introducing gas into the dispersion; and
   (c) removing the liquid carrier to provide a solid article made of bonded particles of the refractory starting material only and having pores derived from bubbles of the gas.

2. The method of claim 4 wherein the critical viscosity is in the range of 25 mPas to 250 mPas.

3. The method of claim 1 wherein the critical viscosity is the range of 25 mPas to 200 mPas and the gas bubbles are introduced by mechanical means.

4. The method of claim 1 wherein the critical viscosity is in the range of about 50 mPas to 250 mPas and the gas bubbles are introduced using a filter of a defined pore size.

5. The method of claim 1 wherein the refractory particles are present in the dispersion in an amount in the range of about 10% to 90% by weight.

6. The method of claim 1 wherein the refractory particles in the dispersion are present in the range of about 40% to 85% by weight.

7. The method of claim 2 wherein the refractory particles in the dispersion are present in the range of about 40% to 85% by weight.

8. The method of claim 1 wherein the particles in the dispersion have an average particle size of less than about 5 micrometers.

9. The method of claim 8 wherein the particles in the dispersion have an average particle size of less than about 2 micrometers.

10. The method of claim 1 wherein the particles in the dispersion have an average particle size of up to about 100 micrometers.

11. The method of claim 1 comprising the step of introducing the gas by bubbling the gas through a filter of a defined port size into the dispersion while being agitated.

12. The method of claim 1 additionally comprising the steps of forcing the gas under high pressure through a fine filter, intimately mixing the gas with the dispersion in a mixing chamber and ejecting it from a nozzle.

13. The method of claim 1 additionally comprising the steps of housing the dispersion in a pressurized vessel and injecting the gas under pressure into the dispersion to produce a foam when ejected via a nozzle.

14. The method of claim 1 additionally comprising the step of adding a gas generating substance to the dispersion causing the generation of gas in situ.

15. The method of claim 1 additionally comprising the step of removing the liquid carrier by drying under reduced pressure.

16. The method of claim 15 additionally comprising including in the dispersion at least one additive to exert an effect when removing the liquid carrier, the additive comprising a resin, gum, cellulose or polymerizable monomer.

17. The method of claim 16 additionally comprising including in the additive a water soluble polymerizable substance, the additive being first dissolved in deionized water or other carrier liquid or a mixture to produce a pre-mixed solution, and an initiator and optionally a catalyst are added to polymerize the monomer and thereby stabilize the dispersion.

18. The method of claim 17 additionally comprising carrying out polymerization at an elevated temperature without a catalyst.

19. A dispersion for use in casting porous refractory articles, the dispersion comprising particles of a refractory starting material in an aqueous liquid carrier, wherein the dispersion has a critical viscosity in the range of 25 mPas to 1000 mPas.

20. The dispersion of claim 19 wherein the critical viscosity is in the range from 25 mPas to 250 mPas.

21. The dispersion of claim 19 wherein the particles in the dispersion have an average particle size of less than about 5 micrometers.

22. The dispersion of claim 19 wherein the particles in the dispersion have an average particle size of less than about 2 micrometers.

23. The dispersion of claim 19 wherein particles have an average particle size of up to about 100 micrometers.

24. The dispersion of claim 19 wherein the refractory particles in the dispersion are present in the range of about 10% to 90% by weight.

25. The dispersion of claim 19 wherein the dispersion comprises a polymerizable material.

26. The dispersion of claim 25 wherein the polymerizable material comprises a monomer and an initiator therefor.

27. The dispersion of claim 25 wherein the polymerizable material is a monosaccharide.

28. The dispersion of claim 25 wherein the polymerizable material is a monosaccharide.

29. A method of making a porous refractory solid article, the method comprising the steps of:
   (a) forming a dispersion comprising particles of refractory starting material in a liquid carrier, the dispersion containing a polymerizable monomeric material;
   (b) introducing gas into the dispersion;
   (c) polymerizing the dispersion containing the monomeric material; and
   (d) removing the liquid carrier to provide a solid article made up of bonded particles of the refractory starting material only and having pores derived from bubbles of the gas.

30. The method of claim 29 comprising polymerizing the monomeric material by cross-linking.

31. The method of claim 29 wherein the monomeric substance is an acrylate.

32. The method of claim 29 wherein the monomeric substance is a monosaccharide.

33. The method of claim 29 wherein the particles in the dispersion have an average particle size of less than about 5 micrometers.

34. The method of claim 33 wherein the particles in the dispersion have an average particle size of less than about 2 micrometers.

35. The method of claim 29 wherein the particles have an average particle size distribution of up to about 100 micrometers.

36. The method of claim 29 wherein the dispersion contains solids in amount of about 10% to 90% by weight.

37. The method of claim 29 comprising the step of introducing the gas into the dispersion by agitation at high speed.

38. The method of claim 29 comprising the step of the introducing the gas by bubbling the gas through a filter of defined pore size into the dispersion while being agitated.

39. The method of claim 38 comprising the step of forcing the gas under high pressure through a fine filter then intimately mixing the gas with the dispersion in a mixing chamber and ejecting the mixture from a nozzle.

40. The method of claim 29 comprising the step of housing the dispersion in a pressurized vessel and injecting the gas under pressure into the dispersion to produce a foam when ejected via a nozzle.

41. The method of claim 29 additionally comprising the step of adding a gas generating substance to the dispersion to generate the gas in situ.

42. The method of claim 29 comprising the step of removing the liquid by drying under reduced pressure.

* * * * *